United States Patent
Takei et al.

(10) Patent No.: US 7,883,804 B2
(45) Date of Patent: Feb. 8, 2011

(54) FUEL CELL CARTRIDGE, FUEL CELL SYSTEM, ELECTRICAL APPARATUS AND METHOD FOR RECOVERING WATER GENERATED IN FUEL CELL SYSTEM

(75) Inventors: Fumio Takei, Kawasaki (JP); Norio Sawatari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1385 days.

(21) Appl. No.: 11/022,819

(22) Filed: Dec. 28, 2004

(65) Prior Publication Data

US 2006/0029839 A1 Feb. 9, 2006

(30) Foreign Application Priority Data

Aug. 5, 2004 (JP) ............... 2004-229772

(51) Int. Cl.
*H01M 8/04* (2006.01)
*H01M 8/00* (2006.01)

(52) U.S. Cl. ........................ 429/414; 429/515
(58) Field of Classification Search ....................... None
See application file for complete search history.

(56) References Cited

U.S. PATENT DOCUMENTS

| 4,876,162 | A | 10/1989 | McElroy |
| 5,364,711 | A | 11/1994 | Yamada et al. |
| 5,723,229 | A | 3/1998 | Scheifers et al. |
| 6,803,638 | B2 | 10/2004 | Takatsuka |
| 2002/0076599 | A1 | 6/2002 | Neutzler et al. |
| 2003/0097762 | A1* | 5/2003 | Hsu ............................ 34/218 |
| 2003/0211374 | A1* | 11/2003 | Dehne ......................... 429/26 |
| 2004/0009381 | A1 | 1/2004 | Sakai et al. |
| 2004/0197635 | A1* | 10/2004 | Ito et al. ....................... 429/34 |
| 2006/0027576 | A1 | 2/2006 | Yokozawa |

FOREIGN PATENT DOCUMENTS

JP 7-326361 12/1995

(Continued)

OTHER PUBLICATIONS

European Search Report dated Dec. 7, 2005, of corresponding European Application No. EP 04 25 8161.

(Continued)

*Primary Examiner*—Jonathan Crepeau
(74) *Attorney, Agent, or Firm*—Westerman, Hattori, Daniels & Adrian, LLP

(57) ABSTRACT

A fuel cell cartridge includes a fuel reservoir configured to supply a fuel to a fuel-cell power generation part and has a water-absorber configured to absorb water formed in the fuel-cell power generation part, at least on part of its outer surface. When the cartridge is attached to a fuel cell system, the fuel in the fuel reservoir is supplied to the fuel cell system. A power generation reaction in the fuel-cell power generation part yields electric power and water. The water is easily and reliably absorbed by the water-absorber without leakage to outside of the fuel cell system. The fuel cell cartridge has a simple structure, is easily handled, can easily and reliably recover water formed in the fuel cell, allows the recovered water to be easily disposed of upon recharge of the fuel and exhibits good recyclability.

36 Claims, 9 Drawing Sheets

FOREIGN PATENT DOCUMENTS

| | | |
|---|---|---|
| JP | 10-289723 | 10/1998 |
| JP | 2002-164070 A | 6/2002 |
| JP | 2003-92128 | 3/2003 |
| JP | 2003-203668 | 7/2003 |
| JP | 2003-203668 A | 7/2003 |
| JP | 2004-165000 * | 6/2004 |
| JP | 2004-152741 A | 5/2005 |
| JP | 2006-49032 A | 2/2006 |

OTHER PUBLICATIONS

Japanese Office Action mailed Aug. 25, 2009, issued in corresponding Japanese Application No. 2004-229772.

* cited by examiner

FUEL CELL CARTRIDGE, FUEL CELL SYSTEM, ELECTRICAL APPARATUS AND METHOD FOR RECOVERING WATER GENERATED IN FUEL CELL SYSTEM

CROSS-REFERENCE TO RELATED APPLICATIONS

This application is based upon and claims the benefits of the priority from the prior Japanese Patent Application No. 2004-229772, filed on Aug. 5, 2004, the entire contents of which are incorporated herein by reference.

BACKGROUND OF THE INVENTION

1. Field of the Invention

The present invention relates to absorption technique capable of easily and reliably absorbing water formed in a fuel cell. More specifically, it relates to a fuel cell cartridge capable of absorbing water formed in a power generation part of a fuel cell, a fuel cell system comprising the fuel cell cartridge, an electrical apparatus comprising the fuel cell system, and a method for recovering water formed in a fuel cell system.

2. Description of the Related Art

Portable information-processing apparatuses such as mobile phones and portable computer systems (notebook personal computers) have been more and more miniaturized, reduced in weight, increased in speed and improved in function. Thus, cells serving as power supplies thereof have been more and more miniaturized, reduced in weight and increased in capacity.

Most popular drive power supplies in the portable information-processing apparatuses are lithium-ion cells. The lithium-ion cells have had a high drive voltage and a high cell capacity from their launch in market, and their performances have been improved along the progress of mobile phone apparatuses.

Improvements in the performances of the lithium-ion cells, however, have some limitations, the lithium-ion cells become to fail to satisfactorily meet the requirements as the drive power supplies of such high-function portable information-processing apparatuses.

Under these circumstances, noble energy devices as alternatives for the lithium-ion cells have been developed. Among them, fuel cells have received attention. These fuel cells can generate electric power by supplying a fuel to an anode to thereby generate electrons and protons, and allowing the protons to react with oxygen supplied to a cathode.

A key feature of the fuel cells is that the fuel is supplied to the anode and oxygen is supplied to the cathode. The fuel cells can thereby generate electric power over a long time by supplying the fuel and the oxygen. They can be applied as power supplies for equipment as in secondary cells (rechargeable batteries), except for supplying the fuel instead of charging in the secondary cells. In addition, fuel cells using methanol as the fuel have a theoretical energy density in terms of active material about ten times higher than that of the lithium-ion cells and can significantly contribute to miniaturization and weight reduction. Accordingly, attempts have been increasingly made to use such fuel cells not only as dispersed power sources and large-size power generators for electric-powered vehicles but also as subminiature power generating units in portable information-processing apparatuses such as notebook personal computers and mobile phones.

In the field of miniature fuel cells, "direct methanol fuel cells" using an aqueous methanol solution as the fuel have been increasingly researched and developed. Unit cells of the direct methanol fuel cells each generally have a fuel electrode, a solid electrolyte, an air electrode, and current collectors arranged so as to sandwich these components.

In the direct methanol fuel cells, water is generated according to the following mechanisms (1), (2) and (3) upon an electric power generation reaction of methanol serving as the fuel. Initially, (1) methanol as the fuel reacts with water (electric power generation reaction) to yield carbon dioxide and $H^+$s (protons) according to the following formula: $CH_3OH(fuel)+H_2O \rightarrow CO_2$ (emitted from the fuel electrode)+$6H^++6e^-$. Next, (2) the $H^+$s(protons) in the solid electrolyte migrate from the fuel electrode to the air electrode (proton conduction) to yield an inward current in the fuel cell. Next, (3) the protons are oxidized in the air electrode to yield water according to the following formula: $6H^++3/2O_2+6e^- \rightarrow 3H_2O$. As is described above, water is generated typically by the electric power generation reaction in the air electrode. When comes in contact with an atmosphere at relatively low temperatures surrounding the fuel cells or with an article at relatively low temperatures, the air containing the water undergoes condensation in the air or upon a surface of the article.

However, such condensed water coming into the inside of an apparatus to be powered by the fuel cells may invite malfunctions or defects in the apparatus and uncomfortable wet conditions to a user. Thus, the fuel cells preferably have a structure and/or function to avoid the water from discharging to outside.

A conventional example of the structure and/or function to avoid the water from discharging to outside is a space (chamber) for recovering and reserving the water in a fuel cell cartridge (Japanese Patent Application Laid-Open (JP-A) No. 2003-92128 and JP-A No. 2003-203668).

According to this technique, however, the fuel cell cartridge has a complicated structure and/or mechanism, requires higher production cost and exhibits a poor handleability. The recovered and retained water is not easily disposed, and the apparatus exhibits poor recycling efficiency. In addition, the presence or absence of water absorption is not easily detected.

Accordingly, an object of the present invention is to provide a fuel cell cartridge that has a simple structure and/or mechanism, does not require high production cost, exhibits satisfactory handleability, can easily and reliably recover the water formed in the fuel-cell power generation part, can easily dispose of the recovered water upon the recharge of the fuel, is easily recyclable and exhibits good recycling efficiency and environmental friendliness.

Another object of the present invention is to provide a fuel cell system that includes the fuel cell cartridge, has a simple structure and/or mechanism, does not require high production cost, exhibits satisfactory handleability, can easily and reliably recover the water formed in the fuel-cell power generation part, can easily dispose of the recovered water upon the recharge of the fuel, is easily recyclable and exhibits good recycling efficiency and environmental friendliness.

Yet another object of the present invention is to provide an electrical apparatus that includes the fuel cell system, can be driven by using clean energy derived from the fuel cell system, can easily and reliably absorb water formed in the fuel cell system without leakage of water inside or outside the apparatus, exhibit satisfactory handleability and can easily dispose of the recovered and retained water.

Another object of the present invention is to provide a method for easily and reliably recovering water formed in a fuel cell system.

SUMMARY OF THE INVENTION

Specifically, the present invention provides a fuel cell cartridge including a fuel reservoir configured to reserve a fuel to be supplied to a fuel-cell power generation part, and a water-absorber configured to absorb water formed in the fuel-cell power generation part.

When the fuel cell cartridge is mounted to a fuel cell system, the fuel reserved in the fuel reservoir is supplied from the fuel reservoir to the fuel-cell power generation part. An electric power generation reaction using the fuel occurs to thereby generate electric power in the fuel-cell power generation part. The electric power generation reaction also yields water. The water is absorbed by the water-absorber arranged at least on part of an outer surface of the fuel cell cartridge. The water formed as a result of the electric power generation reaction is easily and reliably absorbed by the fuel cell cartridge without leakage into surroundings of the fuel cell system.

In the fuel cell cartridge of the present invention, the following aspects are preferred. Specifically, the water-absorber preferably has a water-absorptive member. The water-absorptive member is preferably capable of fixing absorbed water. The water-absorptive member preferably includes at least one of an organic substance and an inorganic substance, which organic substance is at least one selected from a naturally-occurring polymer and a synthetic polymer. The naturally-occurring polymer is preferably at least one selected from the group consisting of cellulose polymers, alginic acid polymers, mannan polymers, pullulan polymers and chitin-chitosan polymers. The synthetic polymer is preferably at least one selected from the group consisting of acrylic polymers, acrylamide polymers, poly (ethylene oxide) polymers and polyester polymers. The inorganic substance is preferably at least one selected from the group consisting of silica gel, zeolite and magnesium oxide. The water-absorber preferably has a signal generator configured to generate a signal indicating water absorption. The signal is preferably be at least one selected from the group consisting of discoloration, deformation, pH change, temperature change, pressure change, magnetic change, voltage change and material absorption-desorption. The signal is preferably capable of being visually detected. The signal generator is preferably so configured as to control signal generation in accordance with the quantity of absorbed water. The signal generator preferably includes a compound capable of discoloring upon water absorption. The compound capable of discoloring upon water absorption is preferably cobalt chloride. The signal generator preferably includes a compound capable of releasing one or more ions upon water absorption, and a pH-indicator. Preferably, the compound capable of releasing one or more ions upon water absorption is at least one selected from weakly alkaline crystals each having a pH upon electrolytic dissociation of more than 7 to 12 or less, and the pH-indicator is at least one selected from phenolphthalein and thymol blue. The signal generator preferably includes a compound capable of color-developing upon dissolution as a result of water absorption. The compound capable of color-developing upon dissolution as a result of water absorption is preferably selected from a dried substance containing sodium nitrite and sulfanilic acid and a dried substance containing N-1-naphthylethylenediamine and tartaric acid. The water-absorber preferably satisfies the following condition:

$$(Y/X) \geq 1.0$$

wherein X (cm$^3$) represents the volume of the water-absorber before water absorption; and Y (cm$^3$) represents the volume of the water-absorber after water absorption. The water-absorber is preferably at least one of a molded article of the water-absorptive member a structure containing a substrate and the water-absorptive member. The water-absorber is preferably a sheet-like structure. The water-absorber is preferably arranged detachably. Preferably, one of sheet faces of the sheet-like water-absorber is detachably stuck to the outer surface of the fuel cell cartridge. The fuel cell cartridge preferably has a columnar shape. The water-absorber is preferably arranged on a peripheral side face of the columnar fuel cell cartridge. The fuel cell cartridge preferably has two or more water-absorbers. The fuel cell cartridge preferably further includes a body configured to supply a fuel reserved in the fuel reservoir to the fuel-cell power generation part. The body configured to supply a fuel reserved in the fuel reservoir to the fuel-cell power generation part, is preferably arranged at one edge of the columnar fuel cell cartridge. The body configured to supply a fuel reserved in the fuel reservoir to the fuel-cell power generation part, preferably includes a nozzle. Preferably, the body configured to supply a fuel reserved in the fuel reservoir to the fuel-cell power generation part, is so configured as to be intruded into the fuel reservoir and is so configured as to supply a fuel reserved in the fuel reservoir to the fuel-cell power generation part upon intrusion into the fuel reservoir. The water formed in the fuel-cell power generation part includes water formed as a result of a fuel cell reaction.

The present invention further provides a fuel cell system including a fuel-cell power generation part including at least a fuel electrode, a solid electrolyte and an air electrode and the fuel cell cartridge of the present invention.

In the fuel cell system, the fuel reserved in the fuel reservoir of the fuel cell cartridge is supplied from the fuel reservoir to the fuel-cell power generation part. An electric power generation reaction using the fuel occurs in the fuel-cell power generation part to generate electric power. The electricity generated by the electric power generation is taken out and utilized. The electric power generation reaction also yields water. The water is absorbed by the water-absorber arranged at least on part of an outer surface of the fuel cell cartridge. The water formed as a result of the electric power generation reaction is easily and reliably absorbed by the fuel cell cartridge without leakage to outside the fuel cell system.

In the fuel cell system, the following aspects are preferred. Specifically, the fuel cell system preferably further includes a body configured to collect the water formed in the fuel-cell power generation part. The body configured to collect the water formed in the fuel-cell power generation part, preferably includes a receiving port for receiving the water formed in the fuel-cell power generation part, and a discharging port for discharging water received from the receiving port into the fuel cell cartridge. Preferably, the receiving port has an opening area greater than the opening area of the discharging port. Preferably, the receiving port of the body configured to collect the water formed in the fuel-cell power generation part, is arranged in contact with the air electrode of the fuel-cell power generation part, and the discharging port of the body configured to collect the water formed in the fuel-cell power generation part, is arranged in contact with the water-absorber of the fuel cell cartridge. The body configured to collect the water formed in the fuel-cell power generation part, is preferably a funnel member. The fuel-cell power generation part, the a body configured to collect the water formed in the fuel-cell power generation part, and the fuel cell cartridge are preferably vertically arranged in this order from above. The fuel electrode, the solid electrolyte and the air electrode are preferably laminated so that their lamination planes are substantially in parallel with a vertical direction.

The present invention further provides an electrical apparatus including the fuel cell system of the present invention. In the electrical apparatus, the fuel reserved in the fuel reservoir of the fuel cell cartridge in the fuel cell system is supplied from the fuel reservoir to the fuel-cell power generation part. Then, an electric power generation reaction using the fuel occurs to thereby generate electric power in the fuel-cell power generation part. The electricity (electric power) generated by the electric power generation is utilized as driving force of the electrical apparatus. The electric power generation reaction also yields water. The water is absorbed by the water-absorber arranged at least on part of an outer surface of the fuel cell cartridge. The water formed as a result of the electric power generation reaction is easily and reliably absorbed by the fuel cell cartridge of the fuel cell system in the electrical apparatus without leakage to outside the electrical apparatus.

The electrical apparatus is preferably at least one of mobile phones, cradles for mobile phones, personal computers, digital cameras, portable audio apparatus, MP3 players, PDAs (personal digital assistants) and toys.

In addition and advantageously, the present invention provides a method for recovering water formed in a fuel cell system, including the step of allowing a water-absorber configured to absorb water formed in the fuel-cell power generation part, to absorb water formed in a fuel cell system, the water-absorber being arranged at least on part of an outer surface of a fuel cell cartridge, the fuel cell cartridge serving to supply a fuel to a fuel-cell power generation part in the fuel cell system.

In the method for recovering water formed in a fuel cell system, the fuel is supplied from the fuel cell cartridge to the fuel-cell power generation part in the fuel cell system. Then, an electric power generation reaction using the fuel occurs to thereby generate electric power in the fuel-cell power generation part. Water is formed as a result of the electric power generation reaction and is absorbed by the water-absorber arranged at least on part of an outer surface of the fuel cell cartridge. Thus, the water formed as a result of the electric power generation reaction is easily and reliably absorbed by the fuel cell cartridge without leakage to outside the fuel cell system.

Further objects, features and advantages of the present invention will become apparent from the following description of the preferred embodiments with reference to the attached drawings.

BRIEF DESCRIPTION OF THE DRAWINGS

FIGS. 4A to 4F are schematic explanatory views illustrating other examples of the fuel cell system of the present invention, in which FIG. 4A shows an example, in which one water-absorber is arranged on part of a surface of the fuel cell cartridge and FIG. 4B is a side view of FIG. 4A; FIG. 4C shows an example, in which three water-absorbers are arranged on part of a surface of the fuel cell cartridge and FIG. 4D is a side view of FIG. 4C; and FIG. 4E shows an example in which the water-absorber is arranged on the entire surface of the fuel cell cartridge and FIG. 4F is a side view of FIG. 4E.

DESCRIPTION OF THE PREFERRED EMBODIMENTS

Fuel Cell Cartridge

Figure 1:
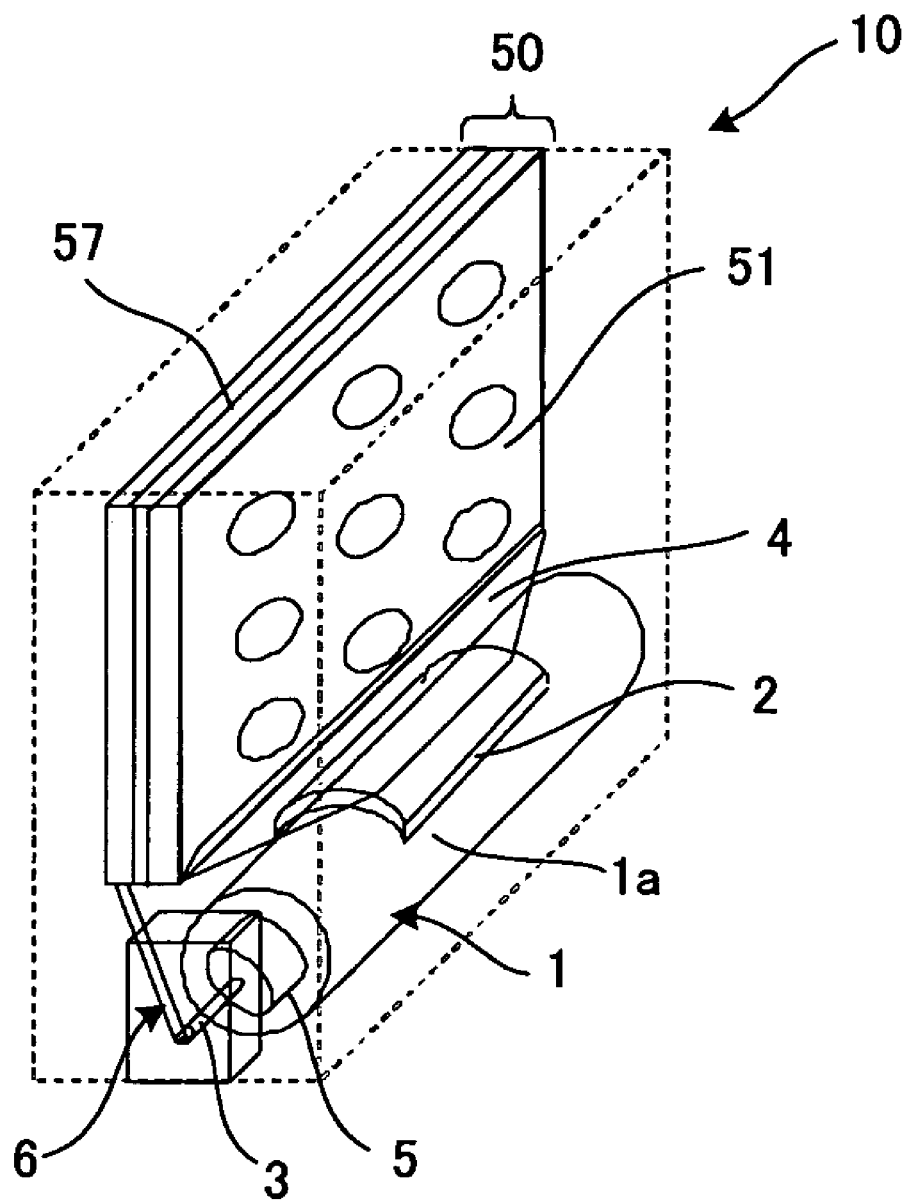
FIGS. 1 and 2 are a schematic perspective view and a side view, respectively, of an example of the fuel cell system of the present invention.

The fuel cell cartridge of the present invention comprises water-absorbing means, that is, a water-absorber configured to absorb water formed in the fuel-cell power generation part, at least on part of an outer surface of the fuel cell cartridge and a fuel reservoir and may further comprise any other means selected according to necessity.

The shape, structure, material, size and other configurations of the fuel cell cartridge are not specifically limited and can be appropriately selected according to the purpose.

Examples of the shape of the fuel cell cartridge are columnar shapes including cylindrical shape and prism shape, conic shapes such as circular conic shape and pyramid shape; truncated conic shapes such as truncated circular conic shape and truncated pyramid shape; and rod shape. Among them, the fuel cell cartridge preferably has a columnar shape and more preferably has a cylindrical shape.

Regarding the structure, the fuel cell cartridge may comprise a single member or two or more members.

The material is preferably selected from materials having satisfactory strength, such as synthetic resins, naturally-occurring resins, metals, glass and ceramics. Each of these materials can be used alone or in combination. Among them, metals and synthetic resins are preferred.

The size of the fuel cell cartridge can be appropriately selected according typically to the size of the fuel cell system to which the fuel cell cartridge is mounted. In the present invention, the fuel cell cartridge specifically preferably has such a size as to be mounted to portable information-processing apparatuses such as mobile phones.

Water-absorbing Means

The water-absorbing means, that is, the water-absorber configured to absorb water formed in the fuel-cell power generation part, can be appropriately selected according to the purpose without limitation, as long as it can absorb the water formed in the fuel-cell power generation part in the fuel cell system. The water-absorbing means, that is, the water-absorber configured to absorb water formed in the fuel-cell power generation part, preferably comprises a water-absorptive member.

The water formed in the fuel cell system may be, for example, water formed as a result of the electric power generation reaction in the fuel cell system.

The water-absorptive member can be appropriately selected according to the purpose without limitation and is, for example, preferably one capable of fixing the absorbed water. This can easily fix the water formed in the fuel cell system and prevent the fixed water from discharging to the outside.

The water-absorptive member capable of fixing the absorbed water is not specifically limited, and its shape, structure, size and other configurations can be appropriately selected according typically to configurations of the fuel cell system and the fuel cell cartridge.

Examples of the material for the water-absorptive member are organic substances and inorganic substances. Each of these materials can be used alone or in combination.

Examples of the organic substances are naturally-occurring polymers and synthetic polymers.

The naturally-occurring polymers include, for example, cellulose polymers, alginic acid polymers, mannan polymers, pullulan polymers and chitin-chitosan polymers. The naturally-occurring polymers may be commercially available products or appropriately prepared by extracting from naturally occurring substances.

The synthetic polymers include, for example, acrylic polymers, acrylamide polymers, poly(ethylene oxide)polymers and polyester polymers. The synthetic polymers may be commercially available products or appropriately prepared synthetically.

The inorganic substances include, for example, silica gel, zeolite and magnesium oxide.

The water-absorbing means, that is, the water-absorber configured to absorb water formed in the fuel-cell power generation part, preferably has such a volume that is substantially constant before and after the water absorption. For example, the water-absorbing means preferably satisfies the following condition:

$$(Y/X) \geq 1.0$$

wherein X ($cm^3$) represents the volume of the water-absorbing means before water absorption; and Y ($cm^3$) represents the volume of the water-absorbing means after water absorption.

The shape of the water-absorbing means, that is, the water-absorber configured to absorb water formed in the fuel-cell power generation part, can be appropriately selected according to the purpose without limitation. Preferred examples of its sectional shape are sheet-like shape and platy shape. Preferred examples of its planar shape are square shape and rectangular shape. Each of these shapes can be employed alone or in combination.

The structure of the water-absorbing means, that is, the water-absorber configured to absorb water formed in the fuel-cell power generation part, can be appropriately selected according to the purpose without limitation and is preferably a molded article structure of the water-absorptive member, and a structure comprising a substrate and the water-absorptive member. Each of these structures can be employed alone or in combination.

When the water-absorbing means has the structure comprising the substrate and the water-absorptive member, the substrate may have, for example, a porous structure or a sheet-like structure and may comprise a soft material and/or a hard material.

For designing the fuel cell cartridge to be recyclable, for example, the water-absorbing means, that is, the water-absorber configured to absorb water formed in the fuel-cell power generation part, is preferably arranged detachably at least on part of an outer surface of the fuel cell cartridge. More preferably, when the water-absorbing means is a sheet-like structure, one of the sheet faces of the water-absorbing means is detachably stuck to at least part of the outer surface of the fuel cell cartridge. By configuring the water-absorbing means to be detachable, the water-absorbing means after water absorption can be easily disposed, the fuel cell cartridge can be very easily regenerated and has very satisfactory recycling efficiency and environmental friendliness. When the water-absorbing means is detachably stuck, the water-absorbing means can be easily disposed of only by peeling off the stuck surface. The resulting fuel cell cartridge can be very easily regenerated and has further satisfactory recycling efficiency and environmental friendliness.

The procedure for sticking the water-absorbing means is not specifically limited and can be selected from among conventional procedures. The sticking can be carried out, for example, by applying a double-sided pressure-sensitive adhesive tape to the water-absorbing means or by applying a coating composition and/or emulsion of a pressure-sensitive adhesive to the water-absorbing means.

When the water-absorbing means, that is, the water-absorber configured to absorb water formed in the fuel-cell power generation part, is detachably arranged at least on part of the outer surface of the fuel cell cartridge, the water-absorbing means can be disposed of and replaced (exchanged) with another one after the water absorption in the water-absorbing means reaches saturation. The time of the disposal and replacement can be appropriately selected according to the purpose without limitation and preferably substantially agrees with, for example, the time when the fuel reserved in the fuel reservoir in the fuel cell cartridge runs out and the fuel cell cartridge is replaced.

To be configured thus, the fuel cell cartridge may be so configured as to satisfy the following condition: $X \leq Y$, wherein X represents the time for the fuel reserved in the fuel reservoir of the fuel cell cartridge to be completely consumed; and Y represents the time for the quantity of absorbed water in the water-absorbing means arranged in the outer surface of the fuel cell cartridge to reach saturation, where the quantity of absorbed water is the total water absorption when a plurality of the water-absorbing means is arranged. The quantity of absorbed water in the water-absorbing means can be desirably controlled by controlling typically the amount and size of the water-absorptive member.

The water-absorbing means, that is, the water-absorber configured to absorb water formed in the fuel-cell power generation part, may be arranged at the outer surface of the fuel cell cartridge partially or entirely, and the configuration thereof can be appropriately selected typically according to shape of the fuel cell cartridge. When the fuel cell cartridge has, for example, the columnar shape, the water-absorbing means is preferably arranged on a peripheral side face of the fuel cell cartridge.

In this case, the fuel cell system can be arranged so that the air electrode and other components of the fuel-cell power generation part are laminated in a direction substantially perpendicular to a plane on which the fuel cell system is arranged (installation plane), and the fuel cell cartridge can be arranged below or under the fuel-cell power generation part so that the peripheral side face of the fuel cell cartridge is substantially in parallel with the plane. Thus, the water formed in the air electrode of the fuel-cell power generation part is allowed to drop by the action of gravitation to thereby be absorbed by the water-absorbing means arranged on the peripheral side face of the fuel cell cartridge. The resulting fuel cell system exhibits satisfactory efficiency in water absorption, can comprise the fuel-cell power generation part and the fuel cell cartridge in a smaller space and can further be miniaturized.

The number of the water-absorbing means, that is, the water-absorber configured to absorb water formed in the fuel-cell power generation part, can be appropriately set according to the purpose without limitation. The fuel cell cartridge may have one water-absorbing means or two or more water-absorbing means. When the fuel cell cartridge comprises two or more water-absorbing means, it can be so configured, for example, that the fuel cell cartridge is rotated at the time when the quantity of absorbed water in one water-absorbing means reaches saturation to thereby allow another water-absorbing means which has not absorbed water to absorb the water.

Whether or not the water is absorbed by the water-absorbing means and/or whether or not the quantity of absorbed water reaches saturation can be easily determined by using signal generating means mentioned later.

Signal Generating Means

The water-absorbing means preferably comprises signal generating means, that is, a signal generator, being so configured as to generate a signal indicating water absorption. This allows any one to easily detect water absorption of the water-absorbing means and to easily determine, for example, whether or not the water-absorbing means should be replaced.

The signal generated by the signal generating means is not specifically limited and can be appropriately selected, as long as the water absorption can be detected or distinguished. Examples of the signal are discoloration, deformation, pH change, temperature change, pressure change, magnetic change, voltage change and material absorption-desorption.

Each of these signals can be used alone or in combination. Among them, preferred are signals that can be easily distinguished and substantially applies no adverse effect on the electrical apparatus using the fuel cell system comprising the fuel cell cartridge. The signal is more preferably one capable of being visually detected, of which discoloration is specifically preferred.

The signal generating means, that is, the signal generator configured to generate a signal indicating water absorption, in the case where the signal is the discoloration may comprise (1) a compound capable of discoloring upon water absorption, (2) a compound capable of releasing one or more ions upon water absorption, and a pH-indicator, or (3) a compound capable of color-developing upon dissolution as a result of water absorption. Each of these can be used alone or in combination.

A suitable example of the compound capable of discoloring upon water absorption in the aspect (1) is cobalt chloride.

Suitable examples of the compound capable of releasing one or more ions upon water absorption in the aspect (2) are weakly alkaline crystals each having a pH upon electrolytic dissociation of more than 7 to 12 or less. Examples of the weakly alkaline crystals are ammonium carbonate, sodium carbonate and sodium tartrate. Examples of the pH-indicator are phenolphthalein and thymol blue.

Suitable examples of the compound capable of color-developing upon dissolution as a result of water absorption in the aspect (3) are a dried substance comprising sodium nitrite and sulfanilic acid, and a dried substance comprising N-1-naphthylethylenediamine and tartaric acid.

The signal generating means, that is, the signal generator configured to generate a signal indicating water absorption, can be any signal generating means that can generate a signal corresponding to the presence or absence of water absorption and is preferably capable of controlling the generation of the signal according to the quantity of absorbed water. In the latter configuration, the generation of the signal can correspond to the quantity of absorbed water in the water-absorbing means, and the quantity of absorbed water can be quantitatively determined by determining the amount of the signal generation. When the signal is the color development, for example, the quantity of absorbed water in the water-absorbing means can be easily visually determined depending on the density of the developed color.

Fuel Reservoir

The shape, structure, material, size and other configuration of the fuel reservoir are not specifically limited, as long as the fuel reservoir can reserve the fuel to be supplied to the fuel-cell power generation part, and are suitably selected according typically to the size of the fuel cell system and/or the electrical apparatus to which the fuel cell cartridge is mounted.

The fuel to be reserved in the fuel reservoir can be suitably selected typically according to the type of the fuel cell system and can be any of liquids and gases. The fuel is generally a liquid and is, for example, methanol when the fuel cell system is a direct methanol fuel cell system.

The fuel reservoir preferably comprises fuel supply means, that is, a body, which is so configured as to supply the reserved fuel to the fuel-cell power generation part.

The fuel supply means, that is, the body configured to supply a fuel reserved in the fuel reservoir to the fuel-cell power generation part, can be appropriately selected according to the purpose without limitation. The fuel supply means is preferably so configured as to be intruded into the fuel reservoir and to supply the fuel reserved in the fuel reservoir to the fuel-cell power generation part upon intrusion into the fuel reservoir. A nozzle is preferably used as such a fuel supply means. This configuration allows the fuel to be supplied to the fuel-cell power generation part only in the case of necessity. Before the fuel cell cartridge is mounted to the fuel cell system, the nozzle (fuel supply means) is not intruded into the fuel reservoir and the fuel in the fuel reservoir is prevented from leaking to the outside of the fuel reservoir. After the fuel cell cartridge is mounted to the fuel cell system, the nozzle is intruded into the fuel reservoir, and the fuel in the fuel reservoir is discharged to the outside of the fuel reservoir to be supplied to the fuel-cell power generation part.

The position at which the fuel supply means, that is, the body configured to supply a fuel reserved in the fuel reservoir to the fuel-cell power generation part, is arranged can be appropriately selected according to the purpose without limitation. When the fuel cell cartridge has, for example, a columnar shape such as cylindrical shape or prism shape and/or a rod shape, the fuel supply means is preferably arranged at one edge of the fuel cell cartridge. This allows the water-absorbing means to be arranged with a large area on the peripheral side face of the fuel cell cartridge.

Other Means

The other means can be appropriately selected according to the purpose without limitation and includes, for example, auxiliary peeling means, protecting means and safety means.

The auxiliary peeling means is means having the function of assisting the water-absorbing means to be peeled off from the fuel cell cartridge upon disposal of the water-absorbing means. It can be appropriately selected according to the purpose without limitation, as long as it has the above-mentioned function, and includes, for example, a separate paper (mount) for conventional pressure-sensitive adhesive tapes. The water-absorbing means can be easily disposed of and/or replaced by placing the separate paper (mount) on a surface of the fuel cell cartridge and allowing the water-absorbing means to be tackily adhered to the surface of the separate paper.

The protecting means is not specifically limited, as long as it can cover at least the surface of the water-absorbing means to thereby prevent the water-absorbing means from absorbing water until the use of the fuel cell cartridge. A cover film for covering the surface of the water-absorbing means, for example, is suitably used.

The safety means is not specifically limited, as long as it has the function of preventing the fuel reserved in the fuel reservoir from leaking to the outside until the use of the fuel cell cartridge. When the fuel cell cartridge has the nozzle, a protective cap for covering the nozzle so as to prevent the intrusion of the nozzle into the fuel reservoir is suitably used.

The fuel cell cartridge of the present invention can be used as being mounted, for example, to a fuel cell system and can be advantageously used in electrical apparatuses, typically miniature portable information-processing apparatuses, as a power supply instead of conventional cells.

When the fuel cell cartridge of the present invention is mounted typically to the fuel cell system, the fuel reserved in the fuel reservoir is supplied from the fuel reservoir to the fuel-cell power generation part. Then, the electric power generation reaction using the fuel occurs to thereby generate electric power in the fuel-cell power generation part. This electric power generation reaction also yields water. The water is absorbed by the water-absorbing means arranged at least on part of an outer surface of the fuel cell cartridge. Thus, the water formed as a result of the electric power generation reaction is easily and reliably absorbed by the fuel cell cartridge to prevent the water from leaking to surroundings of the fuel cell system.

Figure 2:
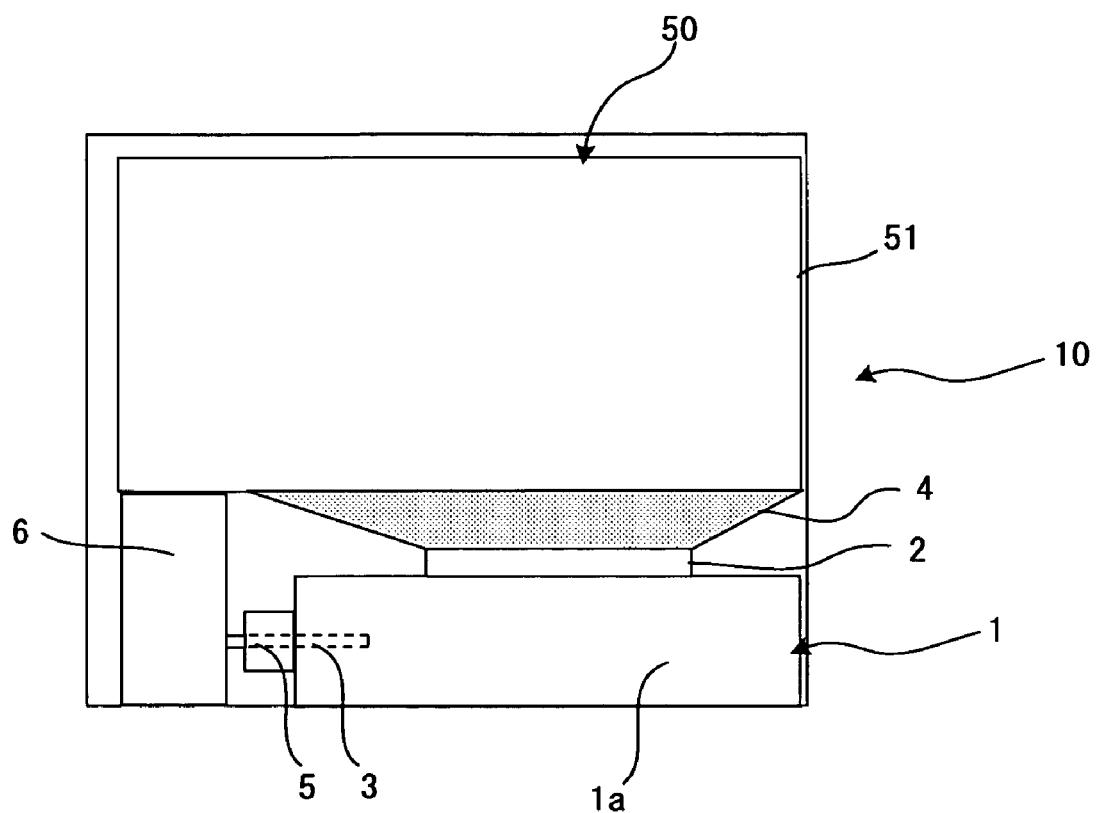
Figure 4A:
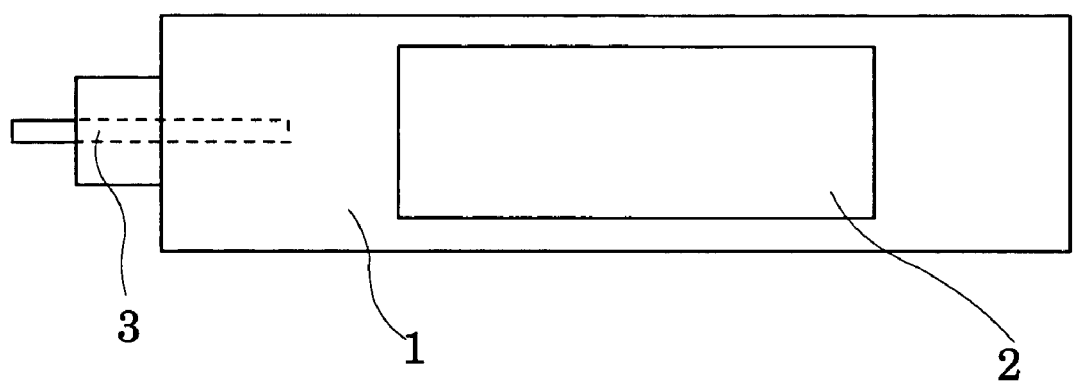
Figure 4B:
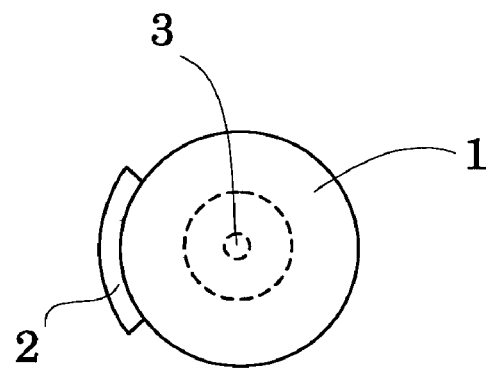

The fuel cell cartridge of the present invention will be illustrated in further detail with reference to the drawings. With reference to FIGS. 1 and 2, a fuel cell cartridge 1 is mounted to a fuel cell system 10. The fuel cell cartridge 1 has a substantially cylindrical shape (FIGS. 1, 2 and 4A-4F) as in a dry cell. A nozzle 3 serving as the fuel supply means is intruded and arranged at one of the two edges of the fuel cell cartridge 1. Part of the nozzle 3 is inserted into a fuel reservoir 1a. Once the nozzle 3 is intruded into the fuel reservoir 1a by the action of a nozzle auxiliary mechanism 5, the fuel in the fuel reservoir 1a is discharged to the outside. A water-absorptive member 2 serving as the water-absorptive member is stuck to a peripheral side face of the fuel cell cartridge 1. The water-absorptive member 2 has a sheet-like shape with a rectangular planar shape. One ply of the water-absorptive member 2 is stuck in FIGS. 4A and 4B, three plies thereof are stuck in FIGS. 4C and 4D, and one ply thereof is stuck so as to cover the entire surface of the peripheral side face in FIGS. 4E and 4F.

The fuel-cell power generation part 50 is arranged over the surface of the water-absorptive member 2. More specifically, the water-absorptive member 2 is arranged near to an air electrode 51 of the fuel-cell power generation part 50 directly or with the interposition of another component. Thus, the water-absorptive member 2 is capable of absorbing water formed in the fuel-cell power generation part 50. More specifically, the surface of the water-absorptive member 2 is arranged below the bottom edge of the air electrode 51 of the fuel-cell power generation part 50 (FIGS. 1 and 2). In the fuel-cell power generation part 50, individual components are laminated so as to constitute lamination planes in a direction substantially perpendicular to the plane of the fuel-cell power generation part 50 to be placed on the water-absorptive member 2.

Figure 4C:
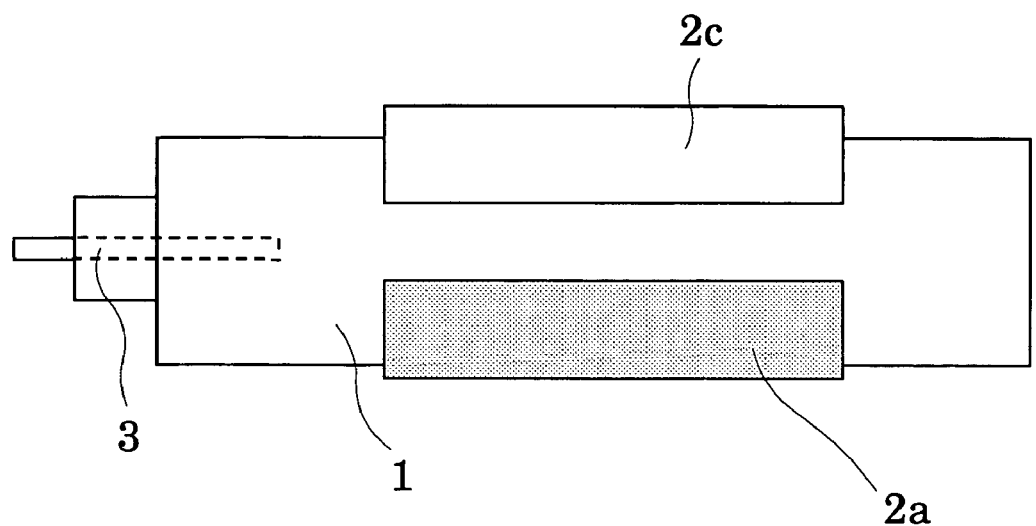
Figure 4D:
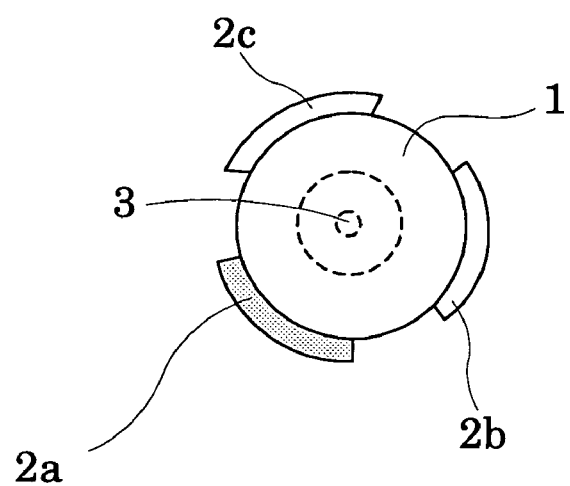
Figure 4E:
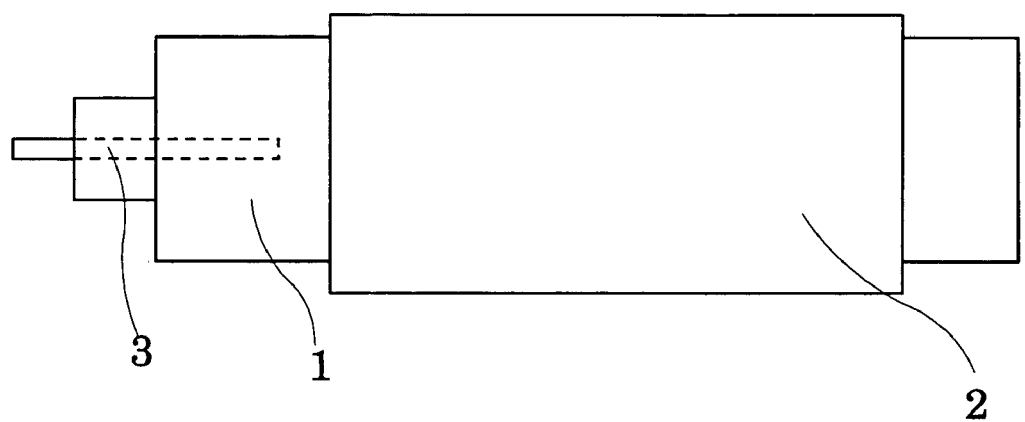
Figure 4F:
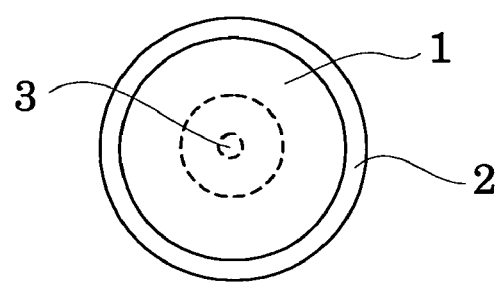

The water-absorptive member 2 comprises, for example, a substance capable of discoloring upon water absorption as the signal generating means and discolors or develops a color upon water absorption from the fuel-cell power generation part 50. Whether or not the water-absorptive member 2 has absorbed water can be easily detected or determined. When the signal such as the color development is detected as shown in FIGS. 4C and 4D, the position of the water-absorptive member 2a from which the signal is detected can be replaced with that of another water-absorptive member 2b or 2c which has not absorbed water, for example, by rotating the fuel cell cartridge 1 in an axial direction. The water can thereby be efficiently absorbed and/or recovered.

Fuel Cell System

The fuel cell system of the present invention comprises a fuel-cell power generation part and the fuel cell cartridge of the present invention and may further comprise any other members such as water-collecting means and a fuel interface, according to necessity.

Fuel-Cell Power Generation Part

The fuel-cell power generation part can be appropriately selected from known or conventional articles without limitation. The fuel-cell power generation part preferably comprises at least a fuel electrode, a solid electrolyte and an air electrode.

The fuel electrode serves as an anode and has the function of oxidizing the fuel to yield protons and electrons.

The fuel electrode can be appropriately selected from known or conventional articles without limitation. The fuel electrode preferably comprises an anode catalyst layer and an anode current collector layer arranged in this order from the solid electrolyte side.

The anode catalyst layer can be appropriately selected from known or conventional articles without limitation, as long as it has the function of oxidizing the fuel. The anode catalyst layer may be prepared, for example, by applying or charging a material to a porous conductive film such as a carbon paper. Examples of the material are fine particles of platinum, an alloy between platinum and a transition metal such as ruthenium; carbon powder; and a polymer capable of forming an electrolyte layer.

The anode current collector layer can be appropriately selected from known or conventional articles without limitation, as long as it can efficiently take out the electrons generated in the anode catalyst layer. A suitable example thereof is a mesh of metal such as stainless steel or nickel (Ni).

The solid electrolyte plays a role as a passage for transporting the protons generated in the anode to the cathode. The solid electrolyte can be appropriately selected from known or conventional articles without limitation. Examples of the materials for the solid electrolyte are materials that are solid at room temperature but can permeate and transport protons as in electrolyte solutions. Among them, ionic conductors having no electron conductivity, such as perfluorosulfonic acid polymers, are preferred. The solid electrolyte may be a commercially available product or appropriately prepared synthetically. The perfluorosulfonic acid, for example, is commercially available as Nafion from E.I. du Pont de Nemours and Company.

The solid electrolyte preferably has a laminar shape, and the thickness thereof can be appropriately selected according to the purpose.

The air electrode serves as a cathode and has the functions of reducing oxygen to yield ions and forming water from the ions and the electrons and protons generated in the fuel electrode.

The air electrode can be appropriately selected according to the purpose without limitation and preferably comprises a cathode catalyst layer and a cathode current collector layer arranged in this order from the solid electrolyte side.

The cathode catalyst layer can be appropriately selected from known or conventional articles without limitation, as long as it has the functions of reducing oxygen to yield ions and forming water from the ions and the electrons and protons generated in the fuel electrode. The cathode catalyst layer may be prepared, for example, by applying or charging a material to a porous conductive film such as a carbon paper. Examples of the material are fine particles of platinum, an alloy between platinum and a transition metal such as ruthenium; carbon powder; and a polymer capable of forming an electrolyte layer.

The cathode current collector layer can be appropriately selected from known or conventional articles without limitation, as long as it is capable of efficiently supplying electrons to the cathode catalyst layer. A suitable example of the material for the cathode current collector layer is a mesh of metal such as stainless steel or nickel (Ni).

The cathode current collector layer preferably has such a structure as to introduce the air (oxygen) by spontaneous diffusion, such as a porous structure.

The fuel electrode, the solid electrolyte and the air electrode constitute, in combination, a unit cell (unit fuel-cell power generation part). The unit cell (unit fuel-cell power generation part) generally comprises layers of the fuel electrode, the solid electrolyte and the air electrode and has a laminar and/or sheet-like shape. The unit cell can be laminated with one or more other unit cells.

The fuel-cell power generation part has only to have one ply of the unit cell or may have two or more unit cells according to desired electric power generation. When two or more plies of the unit cell are contained, they may be arranged, for example, in series or in parallel. In the latter configuration, the plural unit cells may be arranged in one plane, as described in Japanese Patent Application Laid-Open (JP-A) No. 05-325993.

The output voltage of the unit cell can be appropriately selected according to the purpose without limitation and is generally 0.8 V or less and frequently about 0.3 V to about 0.6 V in the case of, for example, the direct methanol fuel cell, while depending on the output current.

The operating voltage required in electrical apparatuses such as portable information-processing apparatuses including mobile phones is generally about 1.5 V to about 12 V. In these applications, therefore, two or more plies of the unit cells are preferably arranged in series to yield a desired voltage.

The position of the unit cell in the fuel cell system can be appropriately selected according to the purpose without limitation and may be substantially horizontal or substantially vertical with respect to the installation plane. In the latter configuration, the water generated in the air electrode can be collected by the action of the gravitation. In this case, the fuel cell cartridge is preferably arranged below or under the fuel-cell power generation part for allowing the water-absorbing means in the fuel cell cartridge to further efficiently absorb the water.

Water-Collecting Means

The water-collecting means, that is, a body configured to collect the water formed in the fuel-cell power generation part, is so configured as to collect the water formed in the fuel-cell power generation part.

The water-collecting means, that is, the body configured to collect the water formed in the fuel-cell power generation part, can be appropriately selected according to the purpose without limitation. The water-collecting means, that is, the body configured to collect the water formed in the fuel-cell power generation part, preferably comprises a receiving port for receiving the water formed in the fuel-cell power generation part and a discharging port for discharging water received from the receiving port into the fuel cell cartridge. In this configuration, the receiving port preferably has an opening area greater than the opening area of the discharging port for higher water-collecting efficiency. Preferably, the receiving port of the water-collecting means is arranged in contact with the air electrode of the fuel-cell power generation part and the discharging port of the water-collecting means is arranged in contact with the water-absorbing means of the fuel cell cartridge for further higher water-collecting efficiency.

The water-collecting means, that is, the body configured to collect the water formed in the fuel-cell power generation part, preferably comprises a funnel member.

The material for the water-collecting means can be appropriately selected according to the purpose without limitation and includes, for example, resins, metals and ceramics.

The position of the water-collecting means can be appropriately selected according to the purpose without limitation. The water-collecting means is, for example, arranged in contact with the air electrode of the fuel-cell power generation part. When the air electrode of the fuel-cell power generation part is arrayed substantially vertically to the installation plane, the water-collecting means, that is, the body configured to collect the water formed in the fuel-cell power generation part, is preferably arranged in contact with the bottom edge of the air electrode for effectively collecting water formed in the air electrode. In this configuration, the fuel cell cartridge is preferably arranged below or under the water-collecting means.

Fuel Interface

The fuel interface has, for example, the function of temporarily storing the fuel delivered from the fuel reservoir of the fuel cell cartridge. By arranging the fuel interface, the fuel can be smoothly and efficiently supplied from the fuel interface to the fuel electrode typically via a fuel induction path by the action of spontaneous movement such as flowage and/or diffusion. Thus, a constant amount of the fuel can be stably supplied to the fuel electrode.

The shape, structure, size and other configurations of the fuel interface can be appropriately selected according to the purpose without limitation.

The position of the fuel interface can be appropriately selected according to the purpose without limitation. The fuel interface is, for example, arranged in the vicinity of the fuel supply means, such as the nozzle, of the fuel cell cartridge.

The fuel cell system of the present invention can be advantageously used in electrical apparatuses, typically miniature portable information-processing apparatuses, as a power supply instead of conventional cells.

In the fuel cell system (fuel cell) of the present invention, the fuel reserved in the fuel reservoir of the fuel cell cartridge is supplied from the fuel reservoir to the fuel-cell power generation part. Then, an electric power generation reaction using the fuel occurs to thereby generate electric power in the fuel-cell power generation part. The electricity (electric power) generated by the electric power generation is utilized, for example, as a drive power supply for electrical apparatuses. The electric power generation reaction also yields water. The water is absorbed by the water-absorbing means arranged at least on part of an outer surface of the fuel cell cartridge. Thus, the water formed as a result of the electric power generation reaction is easily and reliably absorbed by the fuel cell cartridge in the fuel cell system without leakage to the outside of the fuel cell system.

Specific examples of the fuel cell system (fuel cell) of the present invention will be illustrated with reference to the drawings. With reference to FIGS. 1 and 2, the fuel cell system 10 comprises a fuel-cell power generation part 50 and a fuel cell cartridge.

Figure 3:
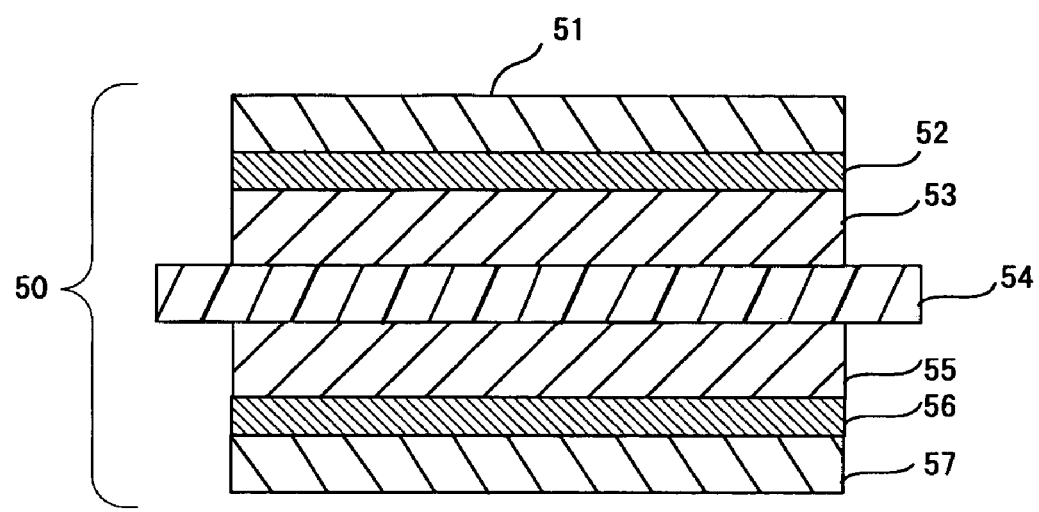
FIG. 3 is a sectional view illustrating an example of a structure of a unit power generation part of a fuel cell.

The fuel-cell power generation part 50 comprises an air-electrode current collector 51, a carbon paper 52, an air electrode (cathode catalyst layer) 53, a solid electrolyte 54, a fuel electrode (anode catalyst layer) 55, a carbon paper 56 and a fuel-electrode current collector 57 laminated in this order (FIG. 3).

The fuel cell cartridge 1 has the above-mentioned configuration and has a substantially cylindrical shape (FIGS. 1, 2 and 4A-4F) as in a dry cell. A nozzle 3 serving as the fuel supply means penetrates one of the two edges of the fuel cell cartridge 1. One end of the nozzle 3 is inserted into a fuel reservoir 1a and the other is inserted into a fuel interface 6. Once the nozzle 3 is intruded into the fuel reservoir 1a by the action of a nozzle auxiliary mechanism 5, the fuel in the fuel reservoir 1a is discharged into the fuel interface 6. A water-absorptive member 2 serving as the water-absorptive member is stuck to a peripheral side face of the fuel cell cartridge 1. The water-absorptive member 2 has a sheet-like shape with a rectangular planar shape. One ply of the water-absorptive member 2 is stuck in FIGS. 4A and 4B, three plies thereof are stuck in FIGS. 4C and 4D, and one ply thereof is stuck so as to cover the entire surface of the peripheral side face in FIGS. 4E and 4F.

The surface of the water-absorptive member 2 is indirectly connected to the air electrode 51 of the fuel-cell power generation part 50 with the interposition of a funnel member 4 serving as the water-collecting means. Thus, the water-absorptive member 2 can absorb water formed in the fuel-cell power generation part 50 via the funnel member 4. More specifically, the fuel-cell power generation part 50 comprises the components having their lamination planes in a direction substantially perpendicular to the installation plane; the funnel member 4 is arranged in contact with the bottom end of the air electrode 51 of the fuel-cell power generation part 50; and the surface of the water-absorptive member 2 is arranged in contact with the other opening of the funnel member 4 (FIGS. 1 and 2).

The water-absorptive member 2 comprises, for example, a substance capable of discoloring upon water absorption as the signal generating means and discolors or develops a color upon water absorption from the fuel-cell power generation part 50. Whether or not the water-absorptive member 2 has absorbed water can be easily detected or determined. When the signal such as the color development is detected as shown in FIGS. 4C and 4D, the position of the water-absorptive member 2a from which the signal is detected can be replaced with that of another water-absorptive member 2b or 2c which has not absorbed water, for example, by rotating the fuel cell cartridge 1 in an axial direction. The water can thereby be efficiently absorbed and/or recovered.

Electrical Apparatus

The electrical apparatus of the present invention comprises at least the fuel cell system of the present invention and has a general configuration necessary for performing functions according to applications.

The electrical apparatus can be appropriately selected according to the purpose without limitation and includes, for example, apparatuses that can be driven by using cells, of which portable information-processing apparatuses are preferred.

Examples of the portable information-processing apparatuses are mobile phones, cradles for mobile phones, personal computers, digital cameras, portable audio apparatus, MP3 players, PDAs (personal digital assistants) and toys.

In the electrical apparatus of the present invention, the fuel reserved in the fuel reservoir of the fuel cell cartridge in the fuel cell system is supplied from the fuel reservoir to the fuel-cell power generation part. Then, an electric power generation reaction using the fuel occurs to thereby generate electric power in the fuel-cell power generation part. The electricity (electric power) generated by the electric power generation is utilized as driving force of the electrical apparatus. The electric power generation reaction also yields water. The water is absorbed by the water-absorbing means arranged at least on part of an outer surface of the fuel cell cartridge. In the fuel cell system of the electrical apparatus, the water formed as a result of the electric power generation reaction is easily and reliably absorbed by the fuel cell cartridge without leakage to the outside of the electrical apparatus.

The electrical apparatus of the present invention will be illustrated in detail with reference to the drawings, by taking a mobile phone and a mobile phone cradle as an example.

Figure 5:
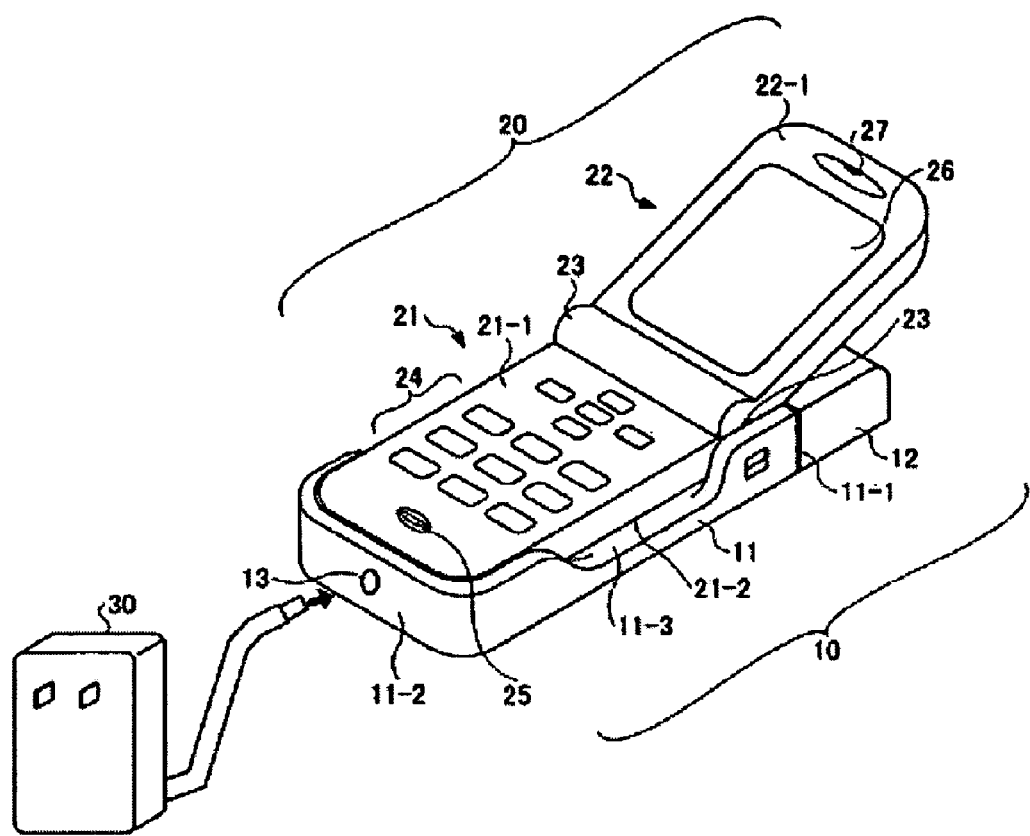
FIG. 5 is a perspective view of a mobile phone mounted to a mobile phone cradle.

FIG. 5 is a perspective view of a mobile phone mounted to a mobile phone cradle. The mobile phone cradle 10 cradles the mobile phone 20 and has such a configuration as to be connected to a power adapter 30 (AC-DC converter) for connecting to an external power supply such as a commercial power supply. The mobile phone 20 comprises a mobile phone main body 21 and a mobile phone movable unit 22. The mobile phone main body 21 comprises function keys 24 and a microphone 25 in an inner surface 21-1. The mobile phone movable unit 22 comprises a liquid crystal display 26 and a speaker 27 in an inner surface 22-1. The mobile phone movable unit 22 is connected to the mobile phone main body 21 by the action of a hinge 23. The mobile phone movable unit 22 is rotatable with the hinge 23 as an axis. The following operations can be carried out while the mobile phone 20 is cradled by the mobile phone cradle 10. The mobile phone 20 can fold so that the inner surface 21-1 of the mobile phone main body 21 faces the inner surface 22-1 of the mobile phone movable unit 22. The mobile phone movable unit 22 is opened and one can push the function keys 24 while watching the liquid crystal display 26. In addition, one can use this unit as a normal mobile phone by holding a main body (cradle main body 11) of the mobile phone cradle 10.

The mobile phone cradle 10 comprises the cradle main body 11 and a fuel cell cartridge 12. The cradle main body 11 houses a fuel cell system (not shown). The fuel cell cartridge 12 houses a fuel. The fuel cell cartridge 12 is arranged in contact with an end face 11-1 of the cradle main body 11 near to the hinge 23 of the mobile phone 20, namely, near to the speaker 27 when the mobile phone movable unit 22 is opened (unfolded). An external power supply connection 13 for connecting to the power adapter 30 is arranged on the other end face 11-2 of the cradle main body near to the microphone 25. The cradle main body 11 serves to hold or cradle the mobile phone main body 21 so that its inner surface 11-3 faces an outer surface 21-2 of the mobile phone main body 21. Hereinafter, an edge of the cradle main body 11 near to the fuel cell cartridge 12 is referred to as "the rear" of the cradle main body 11, and the other edge near to the external power supply connection 13 is referred to as "the front" of the cradle main body 11, for the sake of convenience.

Figure 6:
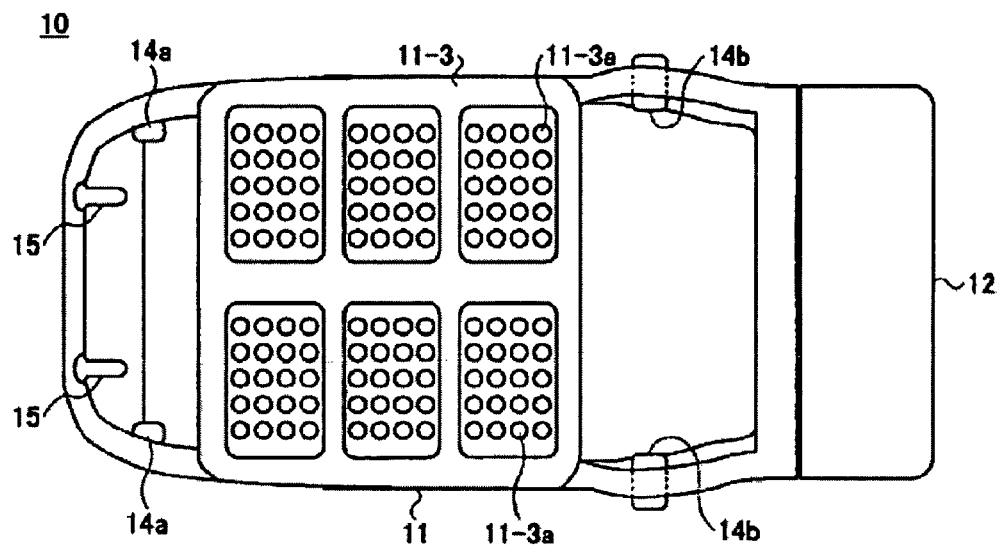
FIG. 6 is a plan view of the mobile phone cradle shown in FIG. 5.
Figure 7:
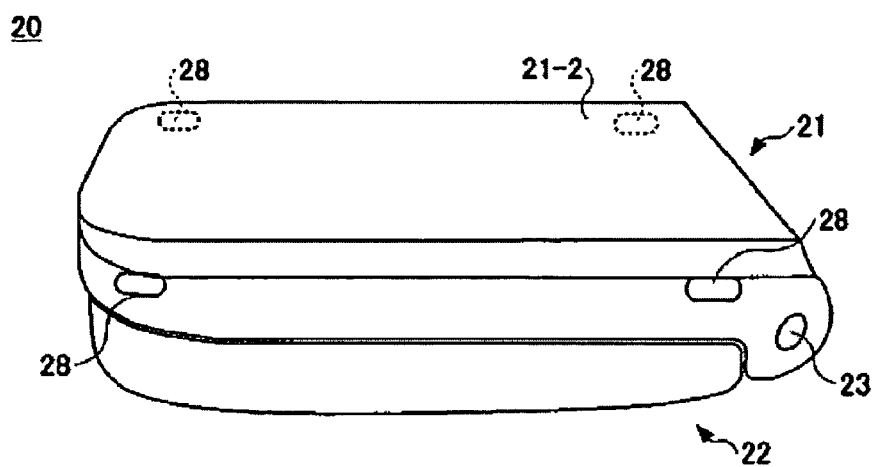
FIG. 7 is a schematic view of the mobile phone shown in FIG. 5.

FIGS. 6 and 7 are plan view of the mobile phone cradle and external perspective view of the mobile phone, respectively. Locking members 14a and 14b and connectors 15 are arranged on the inner surface 11-3 of the cradle main body 11. The locking members 14a and 14b serve to engage with concave portions 28 arranged on a side of the mobile phone main body 21. The connectors 15 serve to supply electric power to the mobile phone 20. The locking members 14a arranged in the front of the inner surface 11-3 serve to engage with two concave portions 28 arranged near to the microphone 25. The locking members 14a each have a spring at the bottom to thereby apply spring stress in a direction toward the mobile phone main body 21. Pawls of the locking members 14a engage with lower inner walls of the concave portions 28 to prevent the mobile phone from easily moving upward.

The locking members 14b arranged in the rear of the inner surface 11-3 of the cradle main body 11 serve to engage with two concave portions 28 arranged near to the hinge 23 (FIGS. 6 and 7). Pawls 14b-1 of the locking members 14b engage with lower inner walls of the concave portions 28 to prevent the mobile phone main body 21 from easily moving upward. The locking members 14b further have convex portions. The convex portions are connected to the pawls and extrude from the side of the cradle main body 11. By pressing down the convex portions, the pawls dissociate themselves from the concave portions 28 to thereby detach the mobile phone main body 21 from the cradle main body 11.

The mobile phone 20 can be attached to the cradle main body 11 in the following manner. Initially, the microphone 25 side of the mobile phone 20 is introduced into the front of the inner surface 11-3 of the cradle main body 11, and the pawls of the front locking members 14a are allowed to engage with the concave portions 28 of the mobile phone main body 21. Next, the mobile phone 20 is pressed to the inner surface 11-3 of the cradle main body 11 to move the hinge 23 side of the mobile phone main body 21 downward, and the pawls of the rear locking members 14b are allowed to engage with the concave portions 28 of the mobile phone main body 21.

The mobile phone 20 can be detached from the cradle main body 11 in the following manner. Initially, the convex portions of the two locking members 14b in the rear of the cradle main body 11 are simultaneously pressed downward and are moved in such a direction as to open the locking members 14b to thereby release the engagement. The hinge 23 side of the mobile phone main body 21 is detached from the cradle main body 11, and the mobile phone 20 is moved in a slanting backward direction to thereby release the engagement with the two front locking members 14a of the cradle main body 11.

As is described above, the mobile phone main body 21 of the mobile phone 20 is fixed by engaging with the cradle main body 11. This unit can thereby be used without anxiety for detaching the mobile phone main body 21 from the cradle main body 11 even when one holds the cradle main body 11 and operates the mobile phone 20 such as presses down the function keys or makes a phone call. In addition, the mobile phone movable unit 22 can fold compact for carrying, since the mobile phone main body 21 is fixed to the cradle main body 11.

Figure 8:
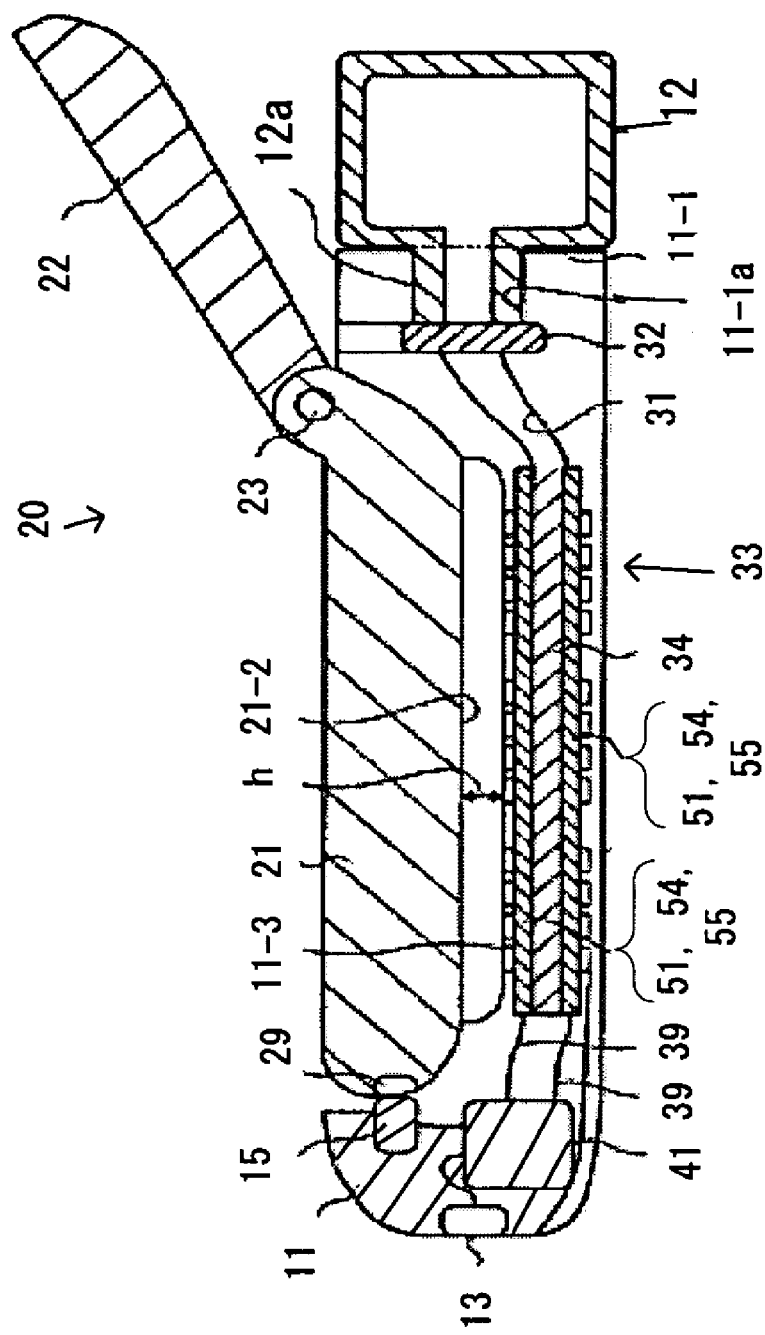
FIG. 8 is a schematic sectional view of the mobile phone mounted to the mobile phone cradle.

With reference to FIG. 8, the cradle main body 11 comprises, for example, a fuel induction path 31, a fuel interception 32, a fuel cell 33, a control unit 41, an external power supply connection 13 and a connector 15. The fuel cell cartridge 12 arranged in contact with the rear end face 11-1 of the cradle main body 11 supplies the fuel to the fuel induction path 31. The fuel interception 32 serves to intercept the induction of the fuel. The fuel cell 33 has a fuel chamber 34 connected to the fuel induction path 31. The control unit 41 serves to control the supply of the electric power generated by the fuel cell 33 to the mobile phone 20. The external power supply connection 13 is connected to the power adapter 30 shown in FIG. 5, to which the electric power is supplied from the external power supply. The connector 15 serves to supply the electric power to the mobile phone 20.

The fuel cell cartridge 12 is in contact with the rear end face 11-1 of the cradle main body 11 and is fixed therewith by engagement. The fuel discharging port 12a of the fuel cell cartridge 12 has a convex shape to thereby engage with the concave portion 11-1a of the end face 11-1 of the cradle main body 11. In FIG. 8, reference characters 29, 39 and h represent an electrode of the mobile phone, wiring and air gap, respectively.

The electrical apparatus of the present invention has been explained herein by taking the mobile phone and the mobile phone cradle as an example. The fuel cell system of the present invention, however, can also be mounted to any other electrical apparatus.

Method for Recovering Water Formed in Fuel Cell System

The method for recovering water formed in a fuel cell system of the present invention at least comprises the step of allowing the water-absorbing means to absorb the water formed in the above-mentioned fuel cell system and may further comprise any other steps or processes according to necessity. The water-absorbing means herein is arranged at least on part of an outer surface of the above-mentioned fuel cell cartridge that serves to supply the fuel to the fuel-cell power generation part in the fuel cell system.

The method for recovering water formed in a fuel cell system can be advantageously carried out by implementing the fuel cell system of the present invention.

The method for recovering water formed in a fuel cell system of the present invention is suitably applied to the absorption and/or recovery of water formed as a result of an electric power generation reaction in the fuel-cell power generation part of the fuel cell system.

In the method for recovering water formed in a fuel cell system of the present invention, the fuel is supplied from the fuel cell cartridge to the fuel-cell power generation part in the fuel cell system. Then an electric power generation reaction using the fuel occurs to thereby generate electric power in the fuel-cell power generation part. The water formed as a result of the electric power generation reaction is absorbed by the water-absorbing means arranged at least on part of an outer surface of the fuel cell cartridge. Thus, the water formed as a result of the electric power generation reaction is easily and reliably absorbed by the fuel cell cartridge without leakage to the outside of the fuel cell system.

EXAMPLES

The present invention will be illustrated in further detail with reference to several examples below, which are not intended to limit the scope of the present invention.

Examples of the fuel cell system of the present invention will be illustrated with reference to the drawings. With reference to FIGS. 1 and 2, the fuel cell system 10 comprises a fuel-cell power generation part 50 and a fuel cell cartridge 1. The fuel cell system 10 is mounted to the mobile phone and the mobile phone cradle shown in FIGS. 5, 6, 7 and 8.

The fuel-cell power generation part 50 comprises an air-electrode current collector 51, a carbon paper 52, an air electrode (cathode catalyst layer) 53, a solid electrolyte 54, a fuel electrode (anode catalyst layer) 55, a carbon paper 56 and a fuel-electrode current collector 57 laminated in this order (FIG. 3). The fuel-cell power generation part 50 is a direct methanol fuel cell.

In this example, the air electrode (cathode catalyst layer) 53 comprises a platinum-supporting catalyst (TEC10E50E, available from Tanaka Kikinzoku Kogyo K. K.). The solid electrolyte 54 comprises a partially fluorinated solid electrolyte (Nafion NF117, available from Du Pont). The fuel electrode (anode catalyst layer) 55 comprises a platinum-ruthenium alloy-supporting catalyst (TEC61E54, available from Tanaka Kikinzoku Kogyo K. K.). The above-mentioned air electrode includes the air-electrode current collector 51, the carbon paper 52 and the air electrode (cathode catalyst layer) 53. The above-mentioned fuel electrode includes the fuel electrode (anode catalyst layer) 55, the carbon paper 56, a shutter (not shown) and the fuel-electrode current collector 57.

The fuel cell cartridge 1 has the above-mentioned configuration and has a substantially cylindrical shape (FIGS. 1, 2 and 4A-4F) as in a dry cell. In this example, a casing constituting the fuel cell cartridge 1 is made from a polysulfone having satisfactory mechanical strength and chemical stability. The casing has a diameter of 15 mm and a length of 60 mm. The fuel cell cartridge 1 includes a fuel reservoir 1$a$ which houses methanol as the fuel. The fuel reservoir 1$a$ in this example can store about 6 ml of the fuel (methanol).

A nozzle 3 serving as the fuel supply means penetrates one of the two end faces of the fuel cell cartridge 1. One end of the nozzle 3 is inserted into a fuel reservoir 1$a$ and the other is inserted into a fuel interface 6. Once the nozzle 3 is intruded into the fuel reservoir 1$a$ by the action of a nozzle auxiliary mechanism 5, the fuel in the fuel reservoir 1$a$ is discharged into the fuel interface 6.

A water-absorptive member 2 serving as the water-absorbing means is stuck to a peripheral side face of the fuel cell cartridge 1. The water-absorptive member 2 has a sheet-like shape with a rectangular planar shape. One ply of the water-absorptive member 2 is stuck in FIGS. 4A and 4B, three plies thereof are stuck in FIGS. 4C and 4D, and one ply thereof is stuck so as to cover the entire surface of the peripheral side face in FIGS. 4E and 4F. The water-absorptive member 2 in this example is a sheet made from 0.2 g of an acrylic polymer (Sanfresh, available from Sanyo Chemical Industries, Ltd.) and is capable of easily absorbing and fixing 5 ml of water.

The surface of the water-absorptive member 2 is indirectly connected to the air electrode 51 of the fuel-cell power generation part 50 with the interposition of a funnel member 4 serving as the water-collecting means. Thus, the water-absorptive member 2 can absorb water formed in the fuel-cell power generation part 50 via the funnel member 4. More specifically, the fuel-cell power generation part 50 comprises the components having their lamination planes in a direction substantially perpendicular to the installation plane; the funnel member 4 is arranged in contact with the bottom end of the air electrode 51 of the fuel-cell power generation part 50; and the surface of the water-absorptive member 2 is arranged in contact with one opening of the funnel member 4 (FIGS. 1 and 2). The other opening of the funnel member 4 has a diameter greater than that of the opening in contact with the water-absorptive member 2.

The water-absorptive member 2 in this embodiment contains cobalt chloride as the signal generating means, presents blue before absorption of the water formed in the fuel-cell power generation part 50 and presents red (pink) after the water absorption. Whether or not the water-absorptive member 2 absorbs water can be easily detected or determined. When the red (pink) color development is detected as shown in FIGS. 4C and 4D, the position of the water-absorptive member 2$a$ developing a red (pink) color can be replaced with that of another water-absorptive member 2$b$ or 2$c$ which has not absorbed water and develops blue, for example, by rotating the fuel cell cartridge 1 in an axial direction. The water can thereby be efficiently absorbed and/or recovered.

In the fuel cell system 10, the fuel (methanol) reserved in the fuel reservoir 1$a$ of the fuel cell cartridge 1 is supplied from the fuel reservoir 1$a$ to the fuel-cell power generation part 50. Then, an electric power generation reaction utilizing the fuel (methanol) occurs in the fuel-cell power generation part 50 to thereby generate electric power. More specifically, (1) methanol as the fuel reacts with water (electric power generation reaction) to generate carbon dioxide and $H^+$ (protons) according to the following formula: $CH_3OH$ (fuel)+ $H_2O \rightarrow CO_2$ (emitted from the fuel electrode (anode catalyst layer) 55)+$6H^+$+$6e^-$. Next, (2) $H^+$ (protons) in the solid electrolyte migrate (proton conduction) from the fuel electrode (anode catalyst layer) 55 to the air electrode (cathode catalyst layer) 53 to generate an inward current in the fuel cell. Subsequently, (3) the protons are oxidized in the air electrode (cathode catalyst layer) 53 to form water, according to the following formula: $6H^+ + 3/2O_2 + 6e^- \rightarrow 3H_2O$. As is described above, water is formed in the air electrode (cathode catalyst layer) 53 as a result of, for example, the electric power generation reaction. The air containing the water undergoes condensation, for example, on the surface of the fuel-cell power generation part 50. The water formed by condensation moves downward by the action of the gravitation. Once the water reaches the bottom of the fuel-cell power generation part 50 (the air electrode (cathode catalyst layer) 53), the water is collected by the funnel member 4 arranged therein, and further moves downward by the action of the gravitation. The water is then absorbed and fixed by water-absorbing member 2. The water-absorbing member 2 is arranged on the outer surface of the fuel cell cartridge 1 in contact with the opening of the funnel member 4. In the fuel cell system 10, the water formed as a result of the electric power generation reaction is easily and reliably absorbed and fixed by the fuel cell cartridge 1 without leakage to the outside of the fuel cell system 10.

The electricity (electric power) generated as a result of the electric power generation reaction in the fuel-cell power generation part 50 is taken out and consumed as the electric power for the mobile phone.

The fuel cell cartridge 1 can be easily regenerated in the following manner. When the fuel (methanol) in the fuel reservoir 1$a$ runs out, the fuel cell cartridge 1 is detached from the fuel cell system 10, another portion of the fuel (methanol) is recharged into the fuel reservoir 1$a$, the water-absorptive member 2 on the surface of the fuel cell cartridge 1 is peeled off and disposed, and another water-absorptive member 2 is stuck to the surface. The fuel cell cartridge 1 exhibits, for example, very satisfactory recycling efficiency, environmental friendliness and handleability. In addition, the fuel cell system 10, the mobile phone and the mobile phone cradle using the fuel cell cartridge 1 exhibit very satisfactory recycling efficiency, environmental friendliness and handleability.

The present invention can solve the conventional problems and achieve the above-mentioned objects in the following manner.

Specifically, the present invention provides the fuel cell cartridge that has a simple structure and/or mechanism, does not require high production cost, can be handled satisfactorily, can easily and reliably absorb the water formed in the fuel-cell power generation part, can allow the recovered water to be easily disposed of upon the recharge of the fuel, can be easily reused and exhibits satisfactory recycling efficiency and environmental friendliness.

The present invention provides the fuel cell system that comprises the fuel cell cartridge, has a simple structure and/or mechanism, does not require high production cost, can be handled satisfactorily, can easily and reliably absorb the water formed in the fuel-cell power generation part, can allow the recovered water to be easily disposed of upon the recharge of the fuel, can be easily reused and exhibits satisfactory recycling efficiency and environmental friendliness.

The present invention also provides the electrical apparatus that comprises the fuel cell system, can be driven by utilizing the clean energy generated by the fuel cell system, can easily and reliably absorb the water formed in the fuel cell system without leakage of the water to the inside and outside of the apparatus, can be satisfactorily handled and allows the recovered and retained water to be easily disposed of.

In addition and advantageously, the present invention provides the method for easily and reliably recovering water formed in the fuel cell system.

The fuel cell cartridge of the present invention can be advantageously used in a variety of fuel cell systems. Among them, the fuel cell cartridge can be particularly preferably used in the fuel cell system, the electrical apparatus and the method for recovering water formed in the fuel cell system according to the present invention.

The fuel cell system of the present invention can be suitably used in a variety of electrical apparatuses including, for example, portable information-processing apparatuses, such as mobile phones, mobile phone cradles, personal computers, digital cameras, portable audio apparatuses, MP3 players and toys. The fuel cell system can be particularly suitably used in the electrical apparatus of the present invention and the method for recovering water formed in a fuel cell system of the present invention.

The electrical apparatus of the present invention can be suitably used as a variety of electrical apparatuses exhibiting satisfactory properties such as recycling efficiency and environmental friendliness.

The method for recovering water formed in a fuel cell system of the present invention can be used for recovering and fixing water formed in a fuel cell system.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A fuel cell cartridge comprising:
   a fuel reservoir configured to reserve a fuel to be supplied to a fuel-cell power generation part; and
   a water-absorber configured to absorb water formed in the fuel-cell power generation part,
   wherein the water-absorber is arranged at least on part of an outer surface of the fuel cell cartridge,
   wherein the water-absorber satisfies the following condition:

$(Y/X) \geq 1.0$ wherein X (cm$^3$) represents the volume of the water-absorber before water absorption; and Y (cm$^3$) represents the volume of the water-absorber after water absorption,
   wherein the water-absorber is a sheet-like structure, and one of sheet faces of the sheet-like water-absorber is detachably stuck to at least part of the outer surface of the fuel cell cartridge,
   wherein the fuel cell cartridge has a columnar shape, and the water-absorber is arranged only on a peripheral side face of the columnar fuel cell cartridge, and
   wherein the fuel-cell cartridge comprises a nozzle, and the water-absorber is arranged on a surface other than a surface comprising the nozzle.

2. A fuel cell cartridge according to claim 1, wherein the water-absorber comprises a water-absorptive member.

3. A fuel cell cartridge according to claim 2, wherein the water-absorptive member is capable of fixing absorbed water.

4. A fuel cell cartridge according to claim 2, wherein the water-absorptive member comprises at least one of an organic substance and an inorganic substance, the organic substance being at least one selected from a naturally-occurring polymer and a synthetic polymer.

5. A fuel cell cartridge according to claim 4, wherein the naturally-occurring polymer is at least one selected from the group consisting of cellulose polymers, alginic acid polymers, mannan polymers, pullulan polymers and chitin-chitosan polymers.

6. A fuel cell cartridge according to claim 4, wherein the synthetic polymer is at least one selected from the group consisting of acrylic polymers, acrylamide polymers, poly (ethylene oxide) polymers and polyester polymers.

7. A fuel cell cartridge according to claim 4, wherein the inorganic substance is at least one selected from the group consisting of silica gel, zeolite and magnesium oxide.

8. A fuel cell cartridge according to claim 1, wherein the water-absorber comprises a signal generator configured to generate a signal indicating water absorption.

9. A fuel cell cartridge according to claim 8, wherein the signal is at least one selected from the group consisting of discoloration, deformation, pH change, temperature change, pressure change, magnetic change, voltage change and material absorption-desorption.

10. A fuel cell cartridge according to claim 8, wherein the signal is capable of being visually detected.

11. A fuel cell cartridge according to claim 8, wherein the signal generator is so configured as to control signal generation in accordance with the quantity of absorbed water.

12. A fuel cell cartridge according to claim 8, wherein the signal generator comprises a compound capable of discoloring upon water absorption.

13. A fuel cell cartridge according to claim 12, wherein the compound capable of discoloring upon water absorption is cobalt chloride.

14. A fuel cell cartridge according to claim 8, wherein the signal generator comprises a compound capable of releasing one or more ions upon water absorption, and a pH-indicator.

15. A fuel cell cartridge according to claim 14,
    wherein the compound capable of releasing one or more ions upon water absorption is at least one selected from weakly alkaline crystals each having a pH upon electrolytic dissociation of more than 7 to 12 or less, and
    wherein the pH-indicator is at least one selected from phenolphthalein and thymol blue.

16. A fuel cell cartridge according to claim 8, wherein the signal generator comprises a compound capable of color-developing upon dissolution as a result of water absorption.

17. A fuel cell cartridge according to claim 16, wherein the compound capable of color-developing upon dissolution as a result of water absorption is at least one selected from the group consisting of a dried substance containing sodium nitrite and sulfanilic acid, and a dried substance containing N-1-naphthylethylenediamine and tartaric acid.

18. A fuel cell cartridge according to claim 2, wherein the water-absorber is at least one of a molded article of the water-absorptive member and a structure comprising a substrate and the water-absorptive member.

19. A fuel cell cartridge according to claim 1, wherein the water-absorber is arranged detachably.

20. A fuel cell cartridge according to claim 1, comprising two or more water-absorbers.

21. A fuel cell cartridge according to claim 1, wherein the nozzle is configured to supply a fuel reserved in the fuel reservoir to the fuel-cell power generation part.

22. A fuel cell cartridge according to claim 21, wherein the fuel cell cartridge has a columnar shape, and wherein the nozzle is arranged at one edge of the columnar fuel cell cartridge.

23. A fuel cell cartridge according to claim 21, wherein the nozzle is so configured as to be intruded into the fuel reservoir and is so configured as to supply the fuel reserved in the fuel reservoir to the fuel-cell power generation part upon intrusion into the fuel reservoir.

24. A fuel cell cartridge according to claim 1, wherein the water formed in the fuel-cell power generation part comprises water formed as a result of a fuel cell reaction.

25. A fuel cell cartridge according to claim 1, which is recyclable.

26. A fuel cell system comprising:
a fuel-cell power generation part comprising at least a fuel electrode, a solid electrolyte and an air electrode; and
a fuel cell cartridge,
wherein the fuel cell cartridge comprises:
a fuel reservoir configured to reserve a fuel to be supplied to the fuel-cell power generation part; and
a water-absorber arranged at least on part of an outer surface of the fuel cell cartridge, the water-absorber serving to absorb water formed in the fuel-cell power generation part,
wherein the water-absorber satisfies the following condition:

$(Y/X) \geq 1.0$ wherein X ($cm^3$) represents the volume of the water-absorber before water absorption; and Y ($cm^3$) represents the volume of the water-absorber after water absorption,
wherein the water-absorber is a sheet-like structure, and one of sheet faces of the sheet-like water-absorber is detachably stuck to at least part of the outer surface of the fuel cell cartridge;
wherein the fuel cell cartridge has a columnar shape, and the water-absorber is arranged only on a peripheral side face of the columnar fuel cell cartridge, and
wherein the fuel-cell cartridge comprises a nozzle, and the water-absorber is arranged on a surface other than a surface comprising the nozzle.

27. A fuel cell system according to claim 26, further comprising a body configured to collect the water formed in the fuel-cell power generation part.

28. A fuel cell system according to claim 27, wherein the body comprises a receiving port for receiving the water formed in the fuel-cell power generation part, and a discharging port for discharging water received from the receiving port into the fuel cell cartridge.

29. A fuel cell system according to claim 28, wherein the receiving port has an opening area greater than the opening area of the discharging port.

30. A fuel cell system according to claim 28,
wherein the receiving port of the body is arranged in contact with the air electrode of the fuel-cell power generation part, and
wherein the discharging port of the body is arranged in contact with the water-absorber of the fuel cell cartridge.

31. A fuel cell system according to claim 27, wherein the body is a funnel member.

32. A fuel cell system according to claim 27, wherein the fuel-cell power generation part, the body and the fuel cell cartridge are vertically arranged in this order from above.

33. A fuel cell system according to claim 26, wherein the fuel electrode, the solid electrolyte and the air electrode of the fuel-cell power generation part are laminated so that their lamination planes are substantially in parallel with a vertical direction.

34. An electrical apparatus comprising a fuel cell system,
wherein the fuel cell system comprises:
a fuel-cell power generation part comprising at least a fuel electrode, a solid electrolyte and an air electrode; and
a fuel cell cartridge,
wherein the fuel cell cartridge comprises:
a fuel reservoir configured to reserve a fuel to be supplied to the fuel-cell power generation part; and
a water-absorber configured to absorb water formed in the fuel-cell power generation part,
wherein the water-absorber is arranged at least on part of an outer surface of the fuel cell cartridge,
wherein the water-absorber satisfies the following condition:

$(Y/X) \geq 1.0$ wherein X ($cm^3$) represents the volume of the water-absorber before water absorption; and Y ($cm^3$) represents the volume of the water-absorber after water absorption,
wherein the water-absorber is a sheet-like structure, and one of sheet faces of the sheet-like water-absorber is detachably stuck to at least part of the outer surface of the fuel cell cartridge;
wherein the fuel cell cartridge has a columnar shape, and the water-absorber is arranged only on a peripheral side face of the columnar fuel cell cartridge, and
wherein the fuel-cell cartridge comprises a nozzle, and the water-absorber is arranged on a surface other than a surface comprising the nozzle.

35. An electrical apparatus according to claim 34, which is at least one selected from the group consisting of mobile phones, cradles for mobile phones, personal computers, digital cameras, portable audio apparatus, MP3 players, PDAs (personal digital assistants) and toys.

36. A method for recovering water formed in a fuel cell system, comprising the step of allowing a water-absorber configured to absorb water formed in a fuel cell system, to absorb water formed in a fuel cell system, the water-absorber being arranged at least on part of an outer surface of a fuel cell cartridge, the fuel cell cartridge serving to supply a fuel to a fuel-cell power generation part in the fuel cell system,
wherein the water-absorber satisfies the following condition:

$(Y/X) \geq 1.0$ wherein X (cm³) represents the volume of the water-absorber before water absorption; and Y (cm³) represents the volume of the water-absorber after water absorption, wherein the water-absorber is a sheet-like structure, and one of sheet faces of the sheet-like water-absorber is detachably stuck to at least part of the outer surface of the fuel cell cartridge, wherein the fuel cell cartridge has a columnar shape, and the water-absorber is arranged only on a peripheral side face of the columnar fuel cell cartridge, and wherein the fuel-cell cartridge comprises a nozzle, and the water-absorber is arranged on a surface other than a surface comprising the nozzle.

* * * * *